US009871966B2

(12) United States Patent
Lee et al.

(10) Patent No.: US 9,871,966 B2
(45) Date of Patent: Jan. 16, 2018

(54) PHOTOGRAPHING APPARATUS AND METHOD OF CONTROLLING THE SAME

(71) Applicant: SAMSUNG ELECTRONICS CO., LTD., Suwon-si, Gyeonggi-do (KR)

(72) Inventors: Yeong-rok Lee, Suwon-si (KR); Hyun-seok Hong, Suwon-si (KR); Sahng-gyu Park, Seongnam-si (KR); Tae-hee Lee, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 29 days.

(21) Appl. No.: 15/190,585

(22) Filed: Jun. 23, 2016

(65) Prior Publication Data

US 2017/0201680 A1 Jul. 13, 2017

(30) Foreign Application Priority Data

Jan. 7, 2016 (KR) .................. 10-2016-0002089

(51) Int. Cl.
*H04N 5/232* (2006.01)
*H04N 1/21* (2006.01)

(52) U.S. Cl.
CPC ....... *H04N 5/23232* (2013.01); *H04N 1/2133* (2013.01); *H04N 1/2137* (2013.01); *H04N 5/23222* (2013.01)

(58) Field of Classification Search
CPC ............... H04N 5/23293; H04N 5/772; H04N 5/23216; H04N 5/23229; H04N 5/23245; H04N 5/23232; H04N 1/2112; H04N 1/215; H04N 1/2133; H04N 1/2137; G09G 2340/0407; G09G 2340/125
See application file for complete search history.

(56) References Cited

U.S. PATENT DOCUMENTS

| 5,990,860 A * | 11/1999 | Takeuchi ............... G09G 5/391 345/667 |
| 6,992,707 B2 * | 1/2006 | Obrador ................ G06T 3/4015 348/207.99 |
| 7,593,037 B2 * | 9/2009 | Matsumoto ............ H04N 5/232 345/546 |

(Continued)

FOREIGN PATENT DOCUMENTS

KR 10-2010-0091614 8/2010

*Primary Examiner* — Michael Osinski
(74) *Attorney, Agent, or Firm* — Nixon & Vanderhye, P.C.

(57) ABSTRACT

A photographing device may reduce additional consumption of memory capacity and power and capture high resolution images. A method of controlling the photographing device includes storing first resolution input images acquired from live view images in a buffer; storing, according to an input of a time point, a second resolution input image acquired at the time point from the live view images in the buffer; and generating a result image based on the second resolution input image when the second resolution input image, which is stored within a threshold time from a photography command reception time point, is found in the buffer, and generating at least one of the stored first resolution image images as the result image when the second resolution input image, which is stored within the threshold time from the photography command reception time point, is not found in the buffer.

19 Claims, 8 Drawing Sheets

(56) References Cited

U.S. PATENT DOCUMENTS

| | | | | |
|---|---|---|---|---|
| 7,683,942 B2 * | 3/2010 | Tsujii | | H04N 5/772 348/231.2 |
| 7,978,234 B2 * | 7/2011 | Yano | | G06T 3/4007 348/222.1 |
| 8,170,375 B2 * | 5/2012 | Watanabe | | H04N 19/172 348/723 |
| 8,385,422 B2 * | 2/2013 | Sato | | G09G 5/391 375/240 |
| 9,134,948 B1 * | 9/2015 | Harnish | | G06F 3/1415 |
| 9,407,818 B2 * | 8/2016 | Deever | | G06T 3/4076 |
| 9,413,921 B2 * | 8/2016 | Matsumoto | | H04N 1/2112 |
| 9,578,249 B2 * | 2/2017 | Yoon | | H04N 1/0044 |
| 9,661,218 B2 * | 5/2017 | Deever | | H04N 5/23232 |
| 2003/0169278 A1 * | 9/2003 | Obrador | | G06T 3/4015 345/629 |
| 2007/0046785 A1 * | 3/2007 | Matsumoto | | H04N 5/232 348/222.1 |
| 2009/0002504 A1 * | 1/2009 | Yano | | G06T 3/4007 348/218.1 |
| 2009/0285489 A1 * | 11/2009 | Kanoh | | G06K 9/2054 382/190 |
| 2010/0027664 A1 * | 2/2010 | Sato | | G09G 5/391 375/240.16 |
| 2010/0064316 A1 * | 3/2010 | Dai | | H04N 5/04 725/38 |
| 2010/0134684 A1 * | 6/2010 | Yamada | | G09G 5/14 348/553 |
| 2011/0052095 A1 * | 3/2011 | Deever | | G06T 3/4076 382/300 |
| 2011/0090366 A1 * | 4/2011 | Yoon | | H04N 1/0044 348/231.2 |
| 2011/0310273 A1 * | 12/2011 | Pien | | H04N 5/2253 348/231.99 |
| 2013/0051771 A1 * | 2/2013 | Yamada | | H04N 5/23245 386/278 |
| 2015/0271355 A1 * | 9/2015 | Matsumoto | | H04N 1/2112 348/231.2 |
| 2015/0281638 A1 * | 10/2015 | Miyauchi | | H04N 7/0122 348/445 |
| 2015/0373414 A1 * | 12/2015 | Kinoshita | | H04N 5/23216 386/282 |
| 2016/0037014 A1 * | 2/2016 | Nozawa | | H04N 9/045 386/224 |
| 2016/0373713 A1 * | 12/2016 | Matsuyama | | H04N 5/772 |
| 2016/0381276 A1 * | 12/2016 | Li | | H04N 5/23206 348/211.3 |

* cited by examiner

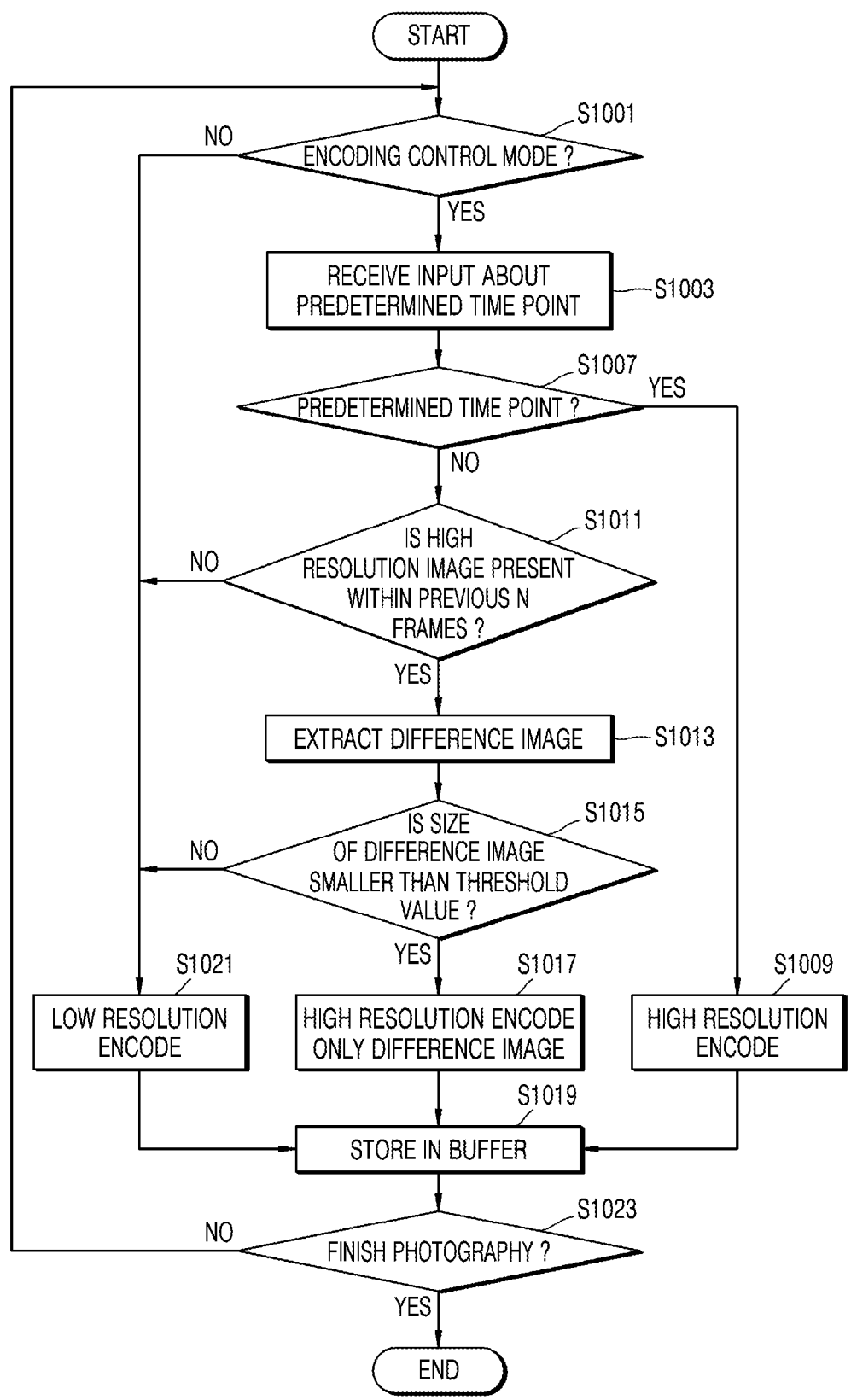

PHOTOGRAPHING APPARATUS AND METHOD OF CONTROLLING THE SAME

CROSS-REFERENCE TO RELATED APPLICATION

This application is based on and claims priority under 35 U.S.C. §119 to Korean Patent Application No. 10-2016-0002089, filed on Jan. 7, 2016, in the Korean Intellectual Property Office, the disclosure of which is incorporated by reference herein in its entirety.

BACKGROUND

1. Field

The present disclosure relates to a photographing device and a method of controlling the same.

2. Description of Related Art

Expectations with respect to image resolution are increasing due to frequent photographing with mobile devices in daily life. However, continuously capturing high resolution images at a high frame rate consumes a great amount of memory and power. Since general mobile devices are limited in terms of memory sizes and battery capacities, it is very costly to manufacture devices that are capable of continuously capturing high resolution images at a high frame rate.

SUMMARY

A photographing device capable of reducing additional consumption of memory capacity and power and continuously capturing high resolution images, and a method of controlling the photographing device are provided.

Additional aspects will be set forth in part in the description which follows and, in part, will be apparent from the description.

According to an aspect of an example embodiment, a method of controlling a photographing device includes storing first resolution input images acquired from live view images in a buffer; storing, based on an input about a time point, a second resolution input image acquired at the time point from the live view images in the buffer; and generating a result image based on the second resolution input image when the second resolution input image, which is stored within a threshold time from a photography command reception time point, is found in the buffer, and generating at least one of the stored first resolution image images as the result image when the second resolution input image, which is stored within the threshold time from the photography command reception time point, is not found in the buffer.

A first resolution and a second resolution may be determined based on settings of an image sensor or determined based on a type of encoding of an input image acquired from the image sensor.

A second resolution may be higher than a first resolution.

The input about the time point may be automatically received based on a preset setting or manually received.

The preset setting may be determined based on photography history data stored in a database.

The preset setting may be periodically determined based on time intervals or frame intervals.

When the second resolution input image, which is stored within the threshold time from the photography command reception time point, is found in the buffer, the result image may be generated using the found second resolution input image.

When the second resolution input image, which is stored within the threshold time from the photography command reception time point, is found in the buffer, the result image may be generated by improving quality of the first resolution input images of the photography command reception time point based on the found second resolution input image.

When the second resolution input image, which is stored within the threshold time from the photography command reception time point, is found in the buffer, the result image may be generated by applying a difference between the found second resolution input image and the first resolution input image of the photography command reception time point to the found second resolution input image.

According to another aspect of an example embodiment, a photographing device includes an input comprising input circuitry configured to receive an input about a time point; a buffer; and a processor configured to store first resolution input images acquired from live view images in the buffer, to store a second resolution input image acquired from the live view images at the time point in the buffer, to generate a result image based on the second resolution input image when the second resolution input image, which is stored within a threshold time from a photography command reception time point, is found in the buffer, and to generate at least one of the stored first resolution image images as the result image when the second resolution input image, which is stored within the threshold time from the photography command reception time point, is not found in the buffer.

A first resolution and a second resolution may be determined based on settings of an image sensor or determined based on a type of encoding of an input image acquired from the image sensor.

A second resolution may be higher than a first resolution.

The input about the time point may be automatically received based on a preset setting or manually received.

The preset setting may be determined based on photography history data stored in a database.

The preset setting may be periodically determined based on time intervals or frame intervals.

When the second resolution input image, which is stored within the threshold time from the photography command reception time point, is found in the buffer, the result image may be generated using the found second resolution input image.

When the second resolution input image, which is stored within the threshold time from the photography command reception time point, is found in the buffer, the result image may be generated by improving quality of the first resolution input images of the photography command reception time point based on the found second resolution input image.

When the second resolution input image, which is stored within the threshold time from the photography command reception time point, is found in the buffer, the result image may be generated by applying a difference between the found second resolution input image and the first resolution input image of the photography command reception time point to the found second resolution input image.

According to an aspect of another example embodiment, a non-transitory computer-readable recording medium having recorded thereon a program, which, when executed by a computer, performs the method of controlling the photographing device including continuously storing first resolution input images acquired from live view images in a buffer; storing, based on an input about a time point, a second resolution input image acquired at the time point from the live view images in the buffer; and generating a result image based on the second resolution input image when the second resolution input image, which is stored within a threshold time from a photography command reception time point, is found in the buffer, and generating at least one of the continuously stored first resolution image images as the result image when the second resolution input image, which is stored within the threshold time from the photography command reception time point, is not found in the buffer.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 10 is a flowchart illustrating an example method of controlling a photographing device that buffers images by controlling an encoding type, according to an example embodiment.

DETAILED DESCRIPTION

Figure 1:
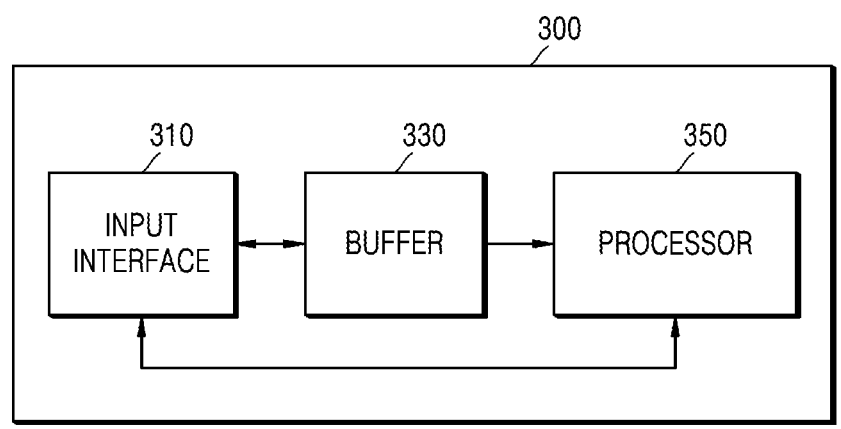
FIG. 1 is a block diagram illustrating an example photographing device according to an example embodiment.

Reference will now be made in detail to various embodiments, examples of which are illustrated in the accompanying drawings. However, it is not intended to limit the example embodiments to the descriptions set forth herein, but, on the contrary, the intention is to cover all modifications, equivalents, and/or alternatives falling within the spirit and the scope of the example embodiments. In the drawings, like reference numerals refer to like elements throughout. Expressions such as "at least one of," when preceding a list of elements, modify the entire list of elements and do not modify the individual elements of the list.

The terms used in the example embodiments are selected as general terms used currently as widely as possible considering the functions in the present disclosure, but they may depend on the intentions of one of ordinary skill in the art, practice, the appearance of new technologies, etc. In specific cases, terms may be arbitrarily selected and also used, and in such cases, their meaning will be described in detail. Thus, it should be noted that the terms used in the description should be understood not based on their literal names but by their given definitions and descriptions through the description.

Also, the term "unit" used herein denotes, but is not limited to, a software or hardware component, such as a Field Programmable Gate Array (FPGA) or Application Specific Integrated Circuit (ASIC), which performs certain tasks. A unit may be configured to be included in an addressable storage medium or configured to execute at least one processor. Thus, a unit may include, for example, components (e.g., software components, object-oriented software components, class components, and task components), processes, functions, attributes, procedures, subroutines, segments of program code, drivers, firmware, microcode, circuitry, data, databases, data structures, tables, arrays, and variables. The components and functions provided in a plurality of units may be combined into fewer components and units, or further separated into additional components and units.

In the present description, 'mobile device' may refer, for example, to relatively small computer devices that may be carried by users, such as mobile phones, personal digital assistants (PDAs), and laptop computers.

In the present description, it will be understood that the terms "comprises" and/or "comprising" used herein specify the presence of stated features (e.g., numbers, functions, operations, etc.) or components, but do not preclude the presence or addition of one or more other features or components.

In the present description, "A or B," "at least one of A and/or B," and "one or more of A and/or B" includes any and all combinations of one or more of the associated listed items. For example, "A or B," "at least one of A and B" and "at least one of A or B" may indicate all of (1) including at least one of A; (2) including at least one of B; and (3) including at least one of A and at least one of B.

In the present description, the terms "first," "second," etc. may be used herein to describe various components regardless of the order and/or importance. These terms are only used to distinguish one component from another. For example, a 'first user device' and a 'second user device' may indicate different user devices regardless of the order or importance. Within the scope of the present disclosure, a first component may be referred to as a second component, and vice versa.

It will be understood that when a component (e.g., first component) is referred to as being "(operatively or communicatively coupled with/to" another component (e.g., second component), it can be coupled directly to the other component or coupled to the other component via an additional component (e.g., third component). However, when a component (e.g., first component) is referred to as being "directly coupled to" or "directly connected to" another component (e.g., second component), an additional component (e.g., third component) may not be present between the aforementioned two components In the present description, the term "configured to" may be exchanged with, for example, "suitable for," "having the capacity to," "designed to," "adapted to," "made to," or "capable of" according to situations. The term "configured to" may not essentially indicate "specifically designed to" perform an operation by hardware. Instead, in some cases, "an apparatus configured to" may indicate an operation that the apparatus is "capable of" with other apparatuses or components. For example, the phrase "a processor configured to perform A, B, and C" may indicate a processor (e.g., embedded processor) exclusively for performing A, B, and C or a generic-purpose processor (e.g., computer processing unit (CPU) or application processor) that is capable of performing A, B, and C by executing at least one software program stored in a memory device.

In the present description, a "frame" may refer, for example, to still images that configure a video.

In the present description, a "frame rate" may refer, for example, to frame display speed of a display device. Usually, the "frame rate" may be expressed as the number of frames shown per second, i.e., frames per second (FPS). Motions of an object may be smoothly displayed when more frames are shown per second.

In the present description, a "frame group" may refer, for example, to a group of a plurality of frames capturing a certain section.

In the present description, the terms used herein are selected to describe example embodiments, and are not used to limit the spirit and scope of the present disclosure. An expression used in the singular encompasses the expression of the plural, unless it has a clearly different meaning in the context. Unless defined otherwise, all terms used in the example embodiments including technical or scientific terms have the same meaning as generally understood by one of ordinary skill in the art. It will be further understood that terms, such as those defined in commonly used dictionaries, should be interpreted as having a meaning that is consistent with their meaning in the context of the related art, and should not be interpreted as having ideal or excessively formal meanings unless it is clearly defined in the description. In some cases, terms defined in the present description cannot exclude the disclosed embodiments herein.

A photographing device according to various example embodiments may include at least one of, for example, smartphones, tablet personal computers (PCs), mobile phones, video phones, e-book readers, desktop PCs, laptop PCs, netbook computers, workstations, servers, PDAs, portable multimedia players (PMPs), MP3 players, mobile medical devices, cameras, and wearable devices, or the like. According to various example embodiments, the wearable device may be at least one of an accessory type (e.g., watches, rings, bracelets, anklets, necklaces, glasses, contact lenses, or head-mounted-devices (HMDs)), a fabric or clothing type (e.g., electronic clothes), a body attachment type (e.g., skin pads or tattoos), and a bioimplant type (e.g., implantable circuits), or the like.

In some example embodiments, the photographing device may include home appliances. Examples of the home appliances may include at least one of TVs, digital video disc (DVD) players, audio players, refrigerators, air conditioners, cleaners, ovens, microwaves, washing machines, air purifiers, set-top boxes, home automation control panels, security control panels, TV boxes (e.g., Samsung HomeSync™, Apple TV™, or Google TV™), game consoles (e.g., Xbox™, PlayStation™), electronic dictionaries, electronic keys, camcorders, and electronic frames, or the like.

According to another example embodiment, the photographing device may include at least one of various types of medical devices (e.g., various portable medical measurement instruments for measuring blood sugar, heart rates, blood pressure, body temperature, etc., magnetic resonance angiography (MRA) apparatuses, magnetic resonance imaging (MRI) apparatuses, computed tomography (CT) apparatuses, capturing devices, or ultrasound devices), navigation devices, global navigation satellite system (GNSS) devices, event data recorders (EDRs), flight data recorders (FDRs), automobile infotainment devices, marine electronic devices (e.g., marine navigation devices, gyro compasses, etc.), avionics devices, security devices, automobile head units, industrial or domestic robots, automatic teller machines (ATMs) of financial organizations, point of sales (POS) devices of shops, and Internet of Things (IoT) devices (e.g., light bulbs, various sensors, electric or gas taximeters, sprinkler devices, fire alarms, thermostats, streetlights, toasters, fitness equipments, hot water tanks, heaters, boilers, etc.), or the like.

According to some example embodiments, the photographing device may include at least one of a portion of furniture or a building/structure, electronic boards, electronic signature receiving devices, projectors, and various measuring instruments (e.g., instruments for measuring water supply, electricity, gas, radio waves, etc.), or the like. According to various example embodiments, the photographing device may be at least one of the aforementioned devices or a combination thereof. The photographing device according to an example embodiment may be a flexible electronic device. Also, the photographing device according to embodiments of the present description is not limited to the aforementioned devices and may include electronic devices that are newly devised by technological development.

Hereinafter, the photographing device according to various example embodiments will be described with reference to the accompanying drawings. In the present disclosure, the term 'user' may indicate a person using the photographing device or a device (e.g., artificial intelligence devices) using the photographing device.

FIG. 1 is a block diagram illustrating an example photographing device 300 according to an example embodiment. The photographing device 300 may include an input interface (e.g., including input circuitry) 310, a buffer 330 and a processor 350.

The input interface 310 may receive an input about a time point for changing characteristic of an image. The predetermined time point for changing the characteristic of the image may be an important moment in which a user is interested. For example, the predetermined time point for changing the characteristic of the image may be when a baseball hitter hits a ball during a baseball game, when a pitcher throws a ball during a baseball game, when golfer swings and hits a golf ball, or the like. The user may want to acquire a high resolution image at the aforementioned time point. However, when the photographing device 300 continuously captures high resolution images, memory capacity and power consumption may increase excessively. Therefore, the photographing device 300 may change settings of an image sensor or an encoding type such that an input about the predetermined time point and acquire high resolution images only at the aforementioned time point.

According to some example embodiments, the user may preset important moments as the predetermined time point. The preset moment may be predicted by various prediction algorithms and be input as the predetermined time point for changing the characteristic of the image.

According to some example embodiments, the predetermined time point for changing the characteristic of the image may be determined periodically without a particular purpose.

The input about the predetermined time point may be automatically received by a preset setting or manually received by the user.

For example, the input interface 310 may automatically set the predetermined time point for changing the characteristic of the image based on photography history data stored in a database. Also, the preset setting may be determined based on various algorithms for predicting moments that are significant for the user or periodically determined based on certain time intervals or certain frame intervals. However, a method of automatically setting the predetermined time point is not limited to the aforementioned examples.

According to some example embodiments, the input about the predetermined time point may be simultaneously received through a plurality of routes. In this case, the predetermined time point may be determined with regard to the plurality of routes comprehensively. For example, the predetermined time point may be determined based on an input that is periodically formed and an input formed by a prediction algorithm.

The input interface 310 may manually receive the input about the predetermined time point from the user via a touch input that is received through a touch screen. Also, the input interface 310 may manually receive the input about the predetermined time point as the user uses buttons of a mobile phone or a smartphone. The input interface 310 may manually receive the input about the predetermined time point through voice commands.

The buffer 330 may be a temporary storage device that stores live view images that are continuously captured even when no photography command is received. The capacity of the buffer 330 may be limited, and thus data may be automatically erased after a certain time. During a single process of photography, the buffer 330 may store high resolution images stored received at the predetermined time point by the input interface 310 and low resolution images stored at other time points. When the photographing device 300 receives a photography command, from among images stored in the buffer 330, the photographing device 300 may select an image that is captured at a time point closest to a photography command reception time point as a result image.

The processor 350 may be configured to store input images acquired from the live view images as first resolution input images in the buffer 330, and store an input image acquired from the live view images at the predetermined time point received by the input interface 310 as a second resolution input image in the buffer 330. A second resolution may be greater than a first resolution.

The processor 350 may be configured to change resolution between the first resolution and the second resolution by controlling settings of the image sensor or by controlling a method of encoding an input image acquired from the image sensor. The method of changing the resolution performed by the processor 350 will be described below with reference to FIGS. 5 to 10.

When a second resolution input image that is stored within a threshold time period after the photography command reception time point is found in the buffer 330, the processor 350 may determine a result image based on the found second resolution input image. When the second resolution input image is not found in the buffer 330, at least one of the first resolution input images may be generated as the result image. In this case, the threshold time may be a default time or received from the user.

The result image being determined based on the found second resolution input image may indicate that the found second resolution input image is generated as the result image, the result image is generated by improving quality of the first resolution input images of the photography command reception time point based on the found second resolution input image, or the result image is generated by applying a difference between the found second resolution input image and the first resolution input images of the photography command reception time point to the found second resolution input image.

The generating of the at least one of the first resolution input images as the result image may indicate generating, from among the first resolution input images, an input image captured at a time point closest to the photography command reception time point, as the result image.

Although the input interface 310, the buffer 330, and the processor 350 are described as separate components according to the present embodiment, according to some embodiments, the input interface 310, the buffer 330, and the processor 350 may be combined and formed as a single component.

Also, although the input interface 310, the buffer 330, and the processor 350 are described as being adjacent in the photographing device 300 according to the present embodiment, since devices that perform respective functions of the input interface 310, the buffer 330, and the processor 350 do not have to be physically adjacent to one another, and the input interface 310, the buffer 330, and the processor 350 may be spaced apart according to some embodiments.

Also, the photographing device 300 is not limited to a physical device. Some functions of the photographing device 300 may be implemented as software instead of hardware.

Figure 2:
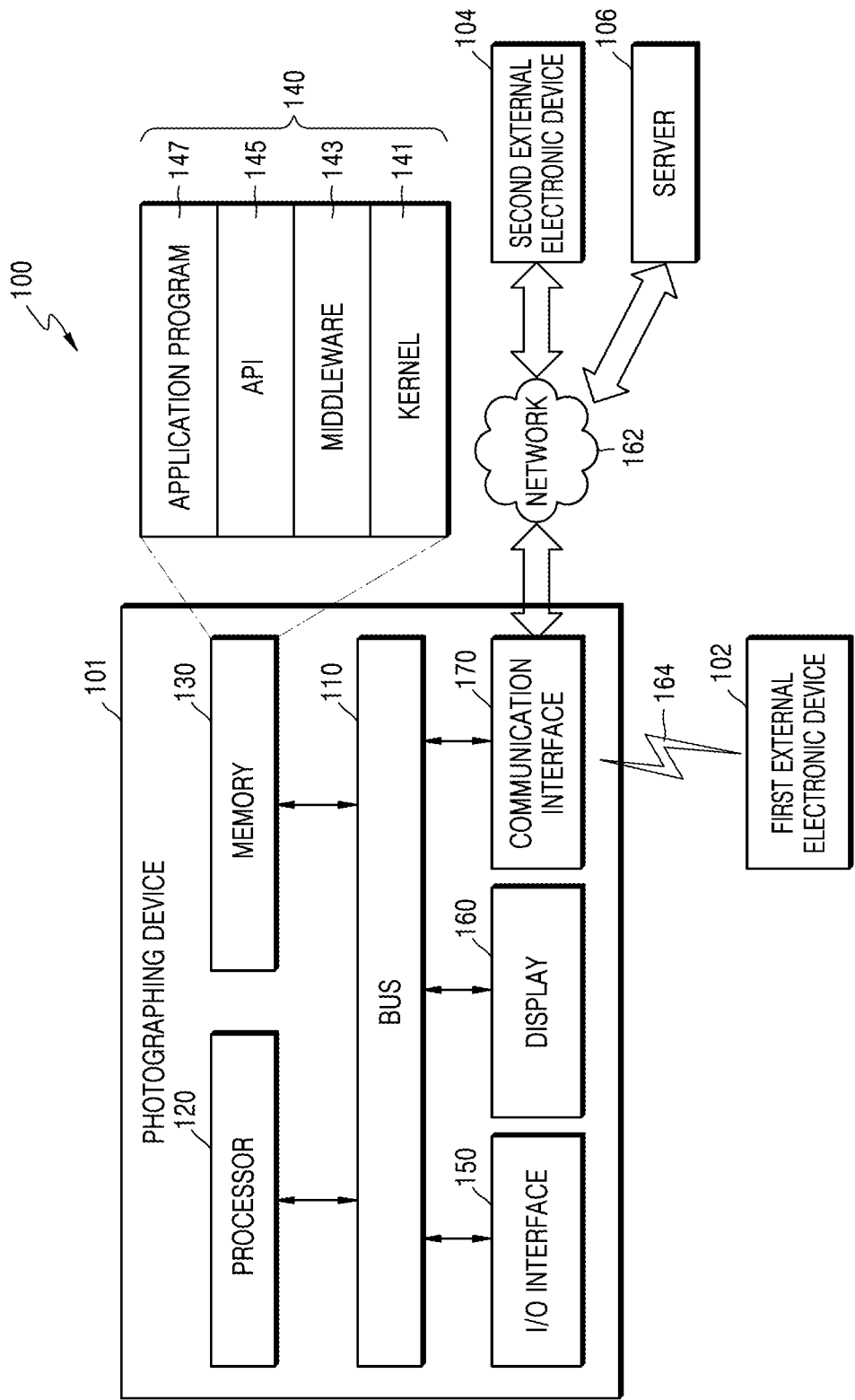
FIG. 2 is a schematic block diagram illustrating an example photographing device in a network environment, according to various example embodiments.

FIG. 2 is a schematic block diagram illustrating an example photographing device 101 in a network environment according to various example embodiments. The photographing device 101 may include a bus 110, a processor 120, a memory 130, an input/output (I/O) interface (e.g., including I/O circuitry) 150, a display 160, and a communication interface (e.g., including communication circuitry) 170.

The I/O interface 150 according to the present example embodiment may partially or completely include the input interface 310 of FIG. 1, the processor 120 may partially or completely include the processor 350 of FIG. 1, and the memory 130 may partially or completely include the buffer 330 of FIG. 1. According to some example embodiments, the photographing device 101 may omit at least one of the aforementioned components or additionally include another component.

The bus 110 may include, for example, include a circuit that interconnects and supports communication (e.g., control messages and/or data) between the bus 110, the processor 120, the memory 130, the I/O interface 150, the display 160, and the communication interface 170.

The processor 120 may include at least one of a CPU, an application processor (AP), and a communication processor (CP). The processor 120 may perform, for example, calculation or data processing related to controlling of and/or communication between at least one of the components of the photographing device 101.

The memory 130 may include volatile and/or non-volatile memory. The memory 130 may, for example, store commands or data related to the at least one of the components of the photographing device 101. According to an embodiment, the memory 130 may store software and/or a program 140.

The program 140 may include, for example, a kernel 141, a middleware 143, an application programming interface (API) 145, and/or an application program (or "application")

147. At least one of the kernel 141, the middleware 143, and the API 145 may be referred to as an operating system (OS).

The I/O interface 150 may function as, for example, an interface for transmitting commands or data from the user or an external device to the component/components of the photographing device 101. The display 160 may include, for example, a liquid crystal display (LCD), a light-emitting diode (LED) display, an organic light-emitting diode (OLED) display, or a microelectromechanical systems (MEMS) display, or an electronic paper display, or the like. The display 160 may display, for example, various types of content (e.g., text, images, videos, icons, symbols, etc.) to the user. The display 160 may include a touch screen, and receive, for example, a touch input, a gesture input, a proximity input, or a hovering input via an electronic pen or a part of the user's body.

The communication interface 170 may, for example, set communication between the photographing device 101 and an external device (e.g., a first external electronic device 102, a second external electronic device 104, or a server 106). For example, the communication interface 170 may be wired or wirelessly connected to a network 162 and communicate with the external device (e.g., the second external electronic device 104 or the server 106).

Wireless communication may use a cellular communication protocol, for example, at least one of Long-Term Evolution (LTE), LTE Advance (LTE-A), code division multiple access (CDMA), wideband CDMA (WCDMA), Universal Mobile Telecommunications System (UMTS), Wireless Broadband (WiBro), and Global System for Mobile Communications (GSM). Each of the first and second external electronic devices 102 and 104 may be a type of device that is the same as or different from that of the photographing device 101. According to an example embodiment, the server 106 may include a server or a group of a plurality of servers. According to various example embodiments, some or all operations performed by the photographing device 101 may be executed by one or a plurality of electronic devices (e.g., the first and second external electronic devices 102 and 104, or the server 106). According to an example embodiment, when the photographing device 101 has to execute a function or provide a service automatically or because of a request, instead of directly executing the function or providing the service, the photographing device 101 may request at least some functions related to the function or the service to another device (e.g., the first and second external electronic devices 102 and 104, or the server 106). The other electronic device (e.g., the first and second external electronic devices 102 and 104, or the server 106) may execute the request function or an additional function, and transmit an execution result to the photographing device 101. The photographing device 101 may directly or additionally process the received result and provide the requested function or the requested service. To do so, for example, technologies such as cloud computing, distributed computing, or client-server computing may be used.

Figure 3:
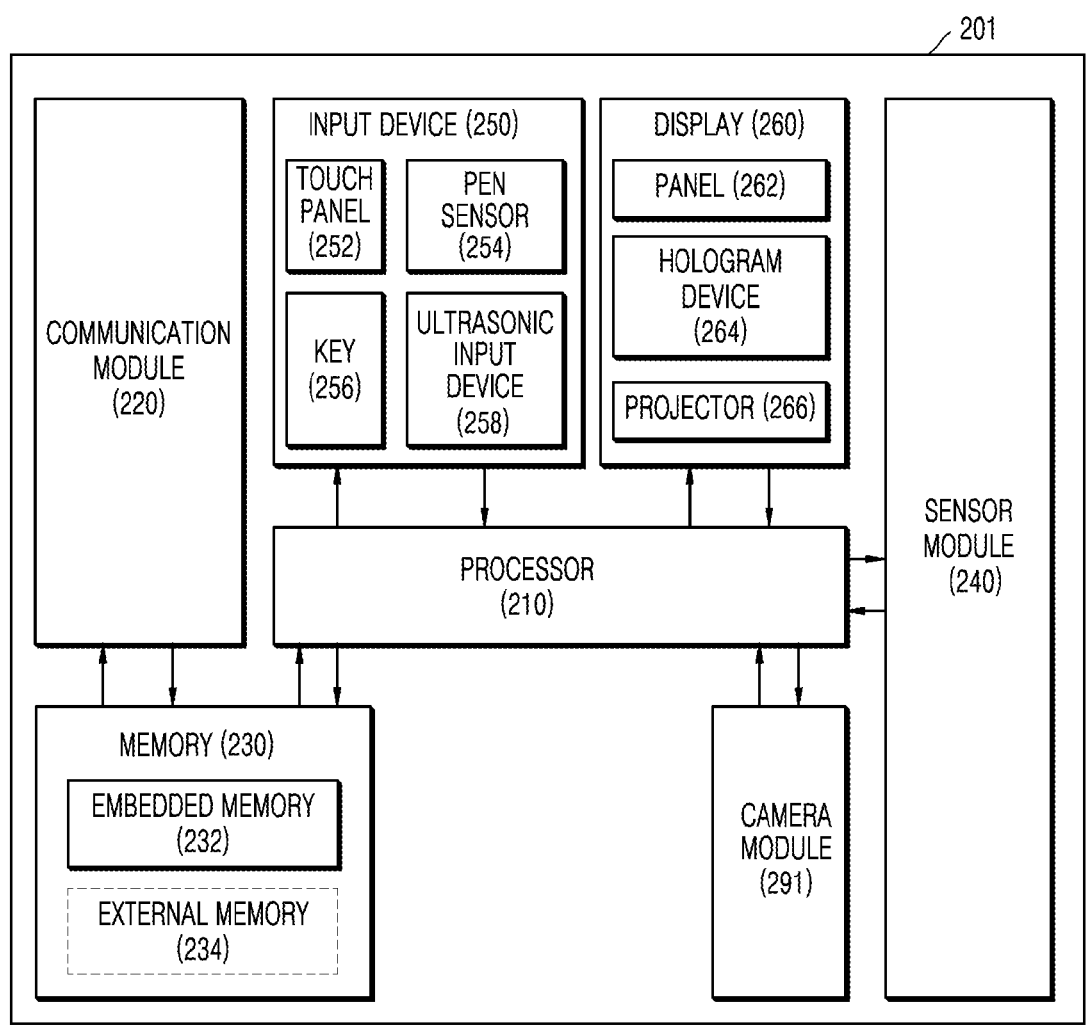
FIG. 3 is a schematic block diagram illustrating an example photographing device according to various example embodiments.

FIG. 3 is a schematic diagram illustrating an example photographing device 201 according to various example embodiments.

The photographing device 201 may, for example, partially or completely include the photographing device 101 of FIG. 2. The photographing device 201 may include at least one processor (e.g., an AP) 210, a communication module (e.g., including communication circuitry) 220, a memory 230, sensor module (e.g., including at least one sensor) 240, an input device (e.g., including input circuitry) 250, a display 260, and a camera module 291.

The processor 210 may, for example, control various hardware or software components connected to the processor 210 by operating an OS or an application program, and perform various data processing and calculation. The processor 210 may be implemented as, for example, a system on chip (SoC). According to an embodiment, the processor 210 may further include a graphic processing unit (GPU) and/or an image signal processor. The processor 210 may include at least some components of FIG. 2 (e.g., cellular module). The processor 210 may load a command or data received from at least one of other components (e.g., non-volatile memory) to volatile memory and process the command or the data, and store various pieces of data in the non-volatile memory.

The communication module 220 may have the same or similar structure as the communication interface 170 of FIG. 2.

The memory 230 (e.g., the memory 130) may include, for example, an embedded memory 232 or an external memory 234.

The sensor module 240 may, for example, measure physical quantity or detect an operation state of the photographing device 201, and convert the measured or detected information into electric signals. The input device 250 may include, for example, a touch panel 252, a (digital) pen sensor 254, a key 256, or an ultrasonic input device 258. The touch panel 252 may use at least one of, for example, capacitive, resistive, infrared, and ultrasonic. Also, the touch panel 252 may further include a control circuit. The touch panel 252 may further include a tactile layer and provide tactile reaction to the user.

The (digital) pen sensor 254 may be, for example, a portion of the touch panel 252 or a separate detection sheet. The key 256 may include, for example, a physical button, an optical key, or a keypad. The ultrasonic input device 258 may detect ultrasound waves generated from an input tool via a microphone (e.g., a microphone) and confirm data that corresponds to the detected ultrasound waves.

The display 260 (e.g., the display 160) may include a panel 262, a hologram device 264, or a projector 266. The camera module 291 may be, for example, a device capable of capturing still images and videos. According to an example embodiment, the camera module 291 may include at least one image sensor (e.g., front sensor or rear sensor), lens, an image signal processor (ISP), or a flash unit (e.g., an LED or xenon lamp, etc.).

In the present description, each of the aforementioned components may be configured as one or more components, and a name of each component may vary according to a type of a photographing device. According to various example embodiments, the photographing device may include at least one of the components described in the present description, and exclude some components or additionally include other components. Also, some components of an electronic device according to various example embodiments may be combined and configured as a single entity, but perform the same functions as the components before being combined.

Figure 4:
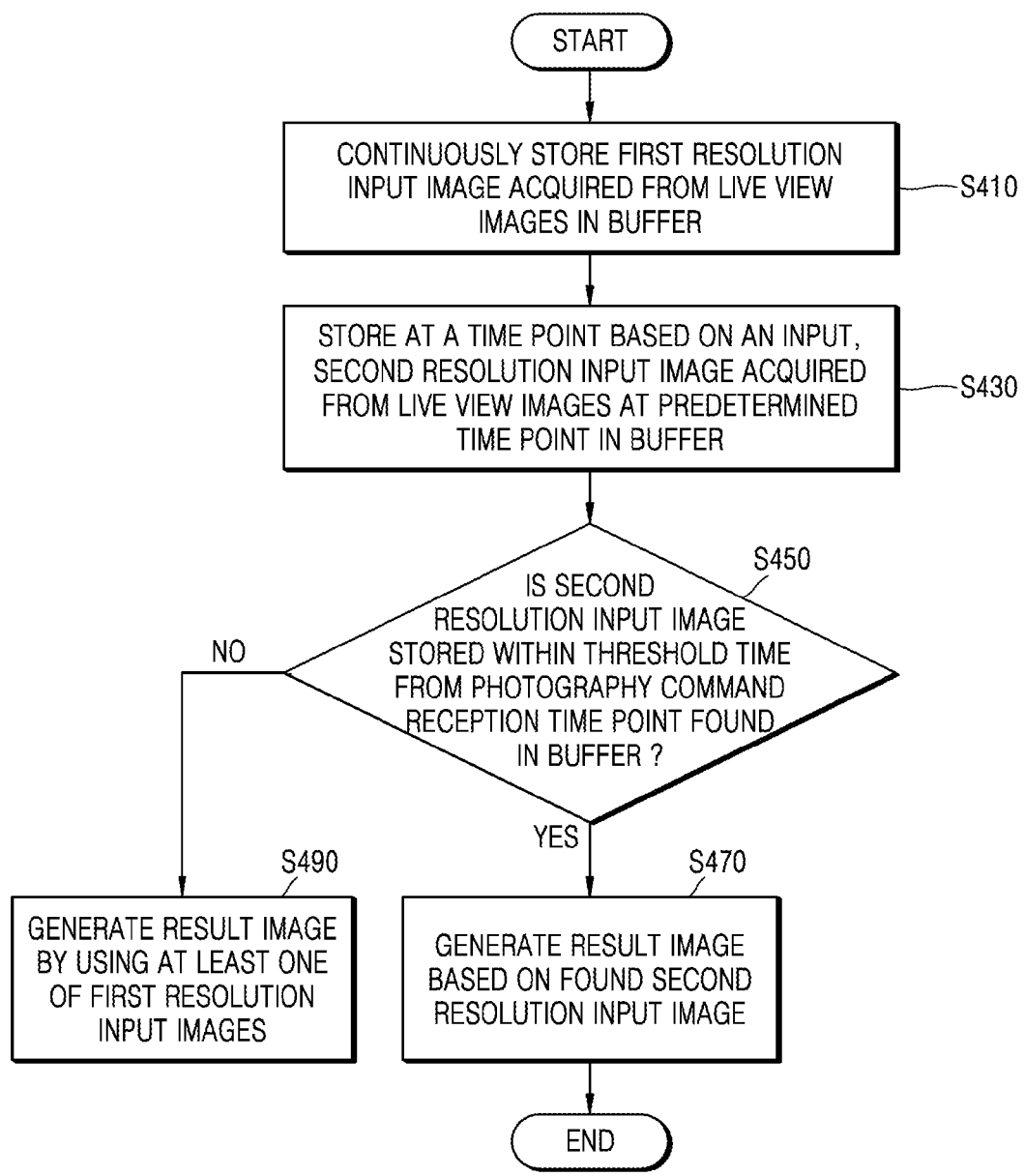
FIG. 4 is a flowchart illustrating an example method of controlling a photographing device that captures images, according to an example embodiment.

FIG. 4 is a flowchart illustrating an example method of controlling a photographing device that captures images, according to an example embodiment.

In operation S410, the photographing device 300 may continuously store input images acquired from live view images in the buffer 330 as first resolution input images. A first resolution may be a predetermined low resolution or a default resolution of the photographing device 300. When the photographing device 300 performs zero shutter lag photography, the photographing device 300 may continuously capture live view images to acquire a still image and store the captured live view images in the buffer 330, search for an image captured at a shutter input reception time point or a photography command reception time point from the buffer 330, and set the found image as a result image. In the present description, the zero shutter lag photography may indicate a photography method of photographing without delay directly after a shutter input of the photographing device is received.

In cases when the photographing device 300 performs photography other than zero shutter lag photography, the photographing device 300 may continuously capture live view images, store the captured live view images in the buffer 330 and thus acquire a result image.

In operation S430, according to an input about a predetermined time point, the photographing device 300 may change settings of the settings of an image sensor at the predetermined time point or change an encoding type and store an input image acquired from the live view images as a second resolution input image in the buffer 330. The second resolution may be a predetermined high resolution or the maximum resolution provided by the photographing device 300.

The photographing device 300 may receive the input about the predetermined time point. The predetermined time point may be a time point at which the photographing device 300 changes characteristics of an image such as resolution, exposure time, etc. For example, the predetermined time point may be an important moment in which the user is interested. The user may want to acquire a high resolution image at the predetermined time point.

According to some example embodiments, a time point for changing a characteristic of an image may be periodically without a particular purpose.

The input about the predetermined time point may be automatically received by preset setting or manually received by the user.

For example, the photographing device 300 may automatically set the time point for changing the characteristic of the image based on photography history data stored in a database. Also, the predetermined time point may be determined based on various algorithms for predicting moments that are significant for the user or periodically determined based on certain time intervals or certain frame intervals. However, a method of automatically setting the predetermined time point is not limited to the aforementioned examples The photographing device 300 may manually receive the input about the predetermined time point from the user via a touch input that is received through a touch screen. Also, the photographing device 300 may manually receive the input about the predetermined time point as the user uses buttons of a mobile phone or a smartphone. The photographing device 300 may manually receive the input about the predetermined time point through voice commands.

The photographing device 300 may change the settings of the image sensor or the encoding type such that a high resolution image is acquired at the predetermined time point. This will be described below with reference to FIGS. 5 and 10.

In operation S450, the photographing device 300 may determine whether a second resolution input image stored within a threshold time period after the photography command reception time point is found in the buffer 330.

When the second resolution input image is found, in operation S470, the photographing device 300 may determine a result image based on the found second resolution input image. The result image being determined based on the found second resolution input image may indicate that the found second resolution input image is generated as the result image, the result image is generated by improving quality of the first resolution input images of the photography command reception time point based on the found second resolution input image, or the result image is generated by applying a difference between the found second resolution input image and the first resolution input images of the photography command reception time point to the found second resolution input image.

When the second resolution input image is not found, in operation S490, the photographing device 300 may generate at least one of first resolution input images as the result image. The generating of the at least one of the first resolution input images as the result image may indicate generating, from among the first resolution input images, an input image captured at a time point closest to the photography command reception time point, as the result image.

Figure 5:
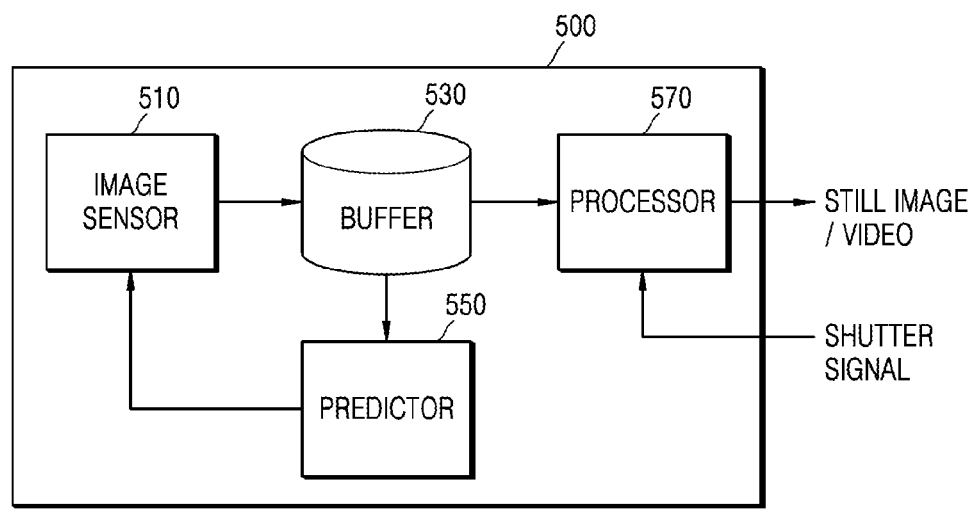
FIG. 5 is a block diagram illustrating an example photographing device that captures images by controlling an image sensor, according to an example embodiment.

FIG. 5 is a block diagram illustrating an example photographing device 500 that captures images by controlling an image sensor 510, according to an example embodiment. The photographing device 500 may include an image sensor 510, a buffer 530, a predictor (e.g., including circuitry configured to predict a predetermined time point) 550, and a processor 570.

The image sensor 510 refers, for example, to a photoelectric converter that is integrated by using technologies for manufacturing semiconductor devices and capable of converting optical signals into electric signals. The photographing device 500 may acquire images with different resolutions according to a method of setting the image sensor 510. For example, the photographing device 500 may acquire images with different resolutions according to an extent of using unit pixels included in the image sensor 510. When all pixels in the image sensor 510 are used, a maximum resolution image may be acquired. A low resolution image may be acquired when fewer pixels are used for photography. The photographing device 500 may change the settings of the image sensor 510 and thus acquire a high resolution input image at a predetermined time point.

The buffer 530 may be a temporary storage device for storing an input image generated by the image sensor 510. The buffer 530 may store high resolution input images generated by the image sensor 510 at the predetermined time point and low resolution input images generated by the image sensor 510 at other time points.

When an input image with a resolution higher than a predetermined resolution is stored in the buffer 530, the predictor 550 may predict a predetermined time point that is significant to the user by using the stored input image. The predictor 550 may predict the predetermined time point by using photography history data stored in a database.

Also, the predictor 550 may include circuitry, including for example processing circuitry, configured to predict a predetermined time point significant for the user by using an algorithm. According to some example embodiments predictor 550 may periodically determine the predetermined time point based on predetermined time intervals or predetermined frame intervals.

The predictor 550 may transmit the predicted predetermined time point to the image sensor 510 and provide information such that the image sensor 510 changes a photography condition at the predetermined time point.

The processor 570 may change resolution by controlling the settings of the image sensor 510.

According to some example embodiments, an image sensor controller may control the settings of the image sensor 510. When a photography command is received, the processor 570 may search for, from the buffer 530, a high resolution input image that is stored within a threshold time period after a photography command reception time point. When the high resolution input image is found, the processor 570 may determine a result image based on the found second resolution input image. When the high resolution input image is not found, at least one of the low resolution input images may be generated as the result image.

The result image being determined based on the found second resolution input image may indicate that the found second resolution input image is generated as the result image, the result image is generated by improving quality of the first resolution input images of the photography command reception time point based on the found second resolution input image, or the result image is generated by applying a difference between the found second resolution input image and the first resolution input images of the photography command reception time point to the found second resolution input image.

The generating of the at least one of the first resolution input images as the result image may indicate generating, from among the first resolution input images, an input image captured at a time point closest to the photography command reception time point, as the result image.

The result image may be a still image or a video.

Although the image sensor 510, the buffer 530, the predictor 550, and the processor 570 are described as separate components according to the present example embodiment, according to some example embodiments, the image sensor 510, the buffer 530, the predictor 550, and the processor 570 may be combined and formed as a single component.

Also, although the image sensor 510, the buffer 530, the predictor 550, and the processor 570 are described as being adjacent in the photographing device 300 according to the present example embodiment, the image sensor 510, the buffer 530, the predictor 550, and the processor 570 do not have to be physically adjacent to one another, and the image sensor 510, the buffer 530, the predictor 550, and the processor 570 may be spaced apart according to some example embodiments.

Also, the photographing device 500 is not limited to a physical device. Some functions of the photographing device 500 may be implemented as software instead of hardware.

Figure 6:
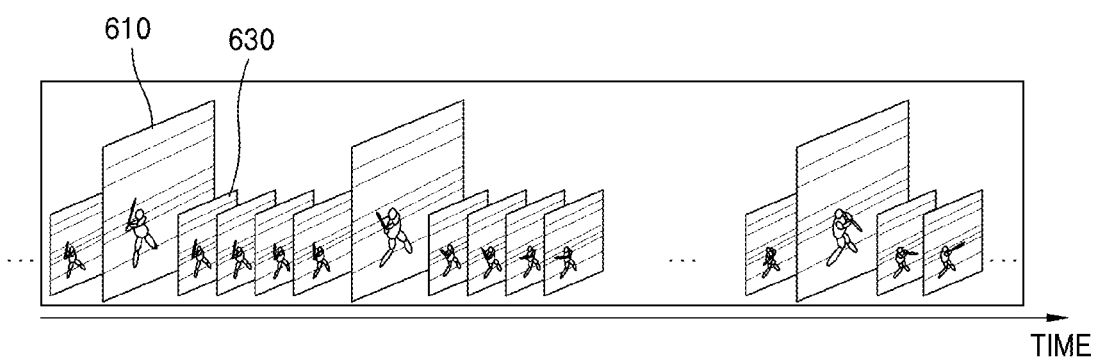
FIG. 6 is a diagram illustrating example input images acquired by controlling an image sensor being stored in a buffer, according to an example embodiment.

FIG. 6 is a diagram illustrating example input images acquired by controlling an image sensor being stored in a buffer, according to an example embodiment.

The photographing device 500 may store a high resolution image 610 and a low resolution image 630 in the buffer 530. The present embodiment may be an example in which a predetermined time point is determined based on predetermined time intervals. For example, the user may set the photographing device 500 to acquire a high resolution image per every 3 seconds.

When a video is captured at a high frame rate, the photographing device 500 may reduce the amount of memory and power required for photography by not capturing the entire scene as high resolution images. However, high resolution images may be used to improve quality of low resolution images, and thus acquire an effect similar to when the entire scene is captured as high resolution images.

Figure 7:
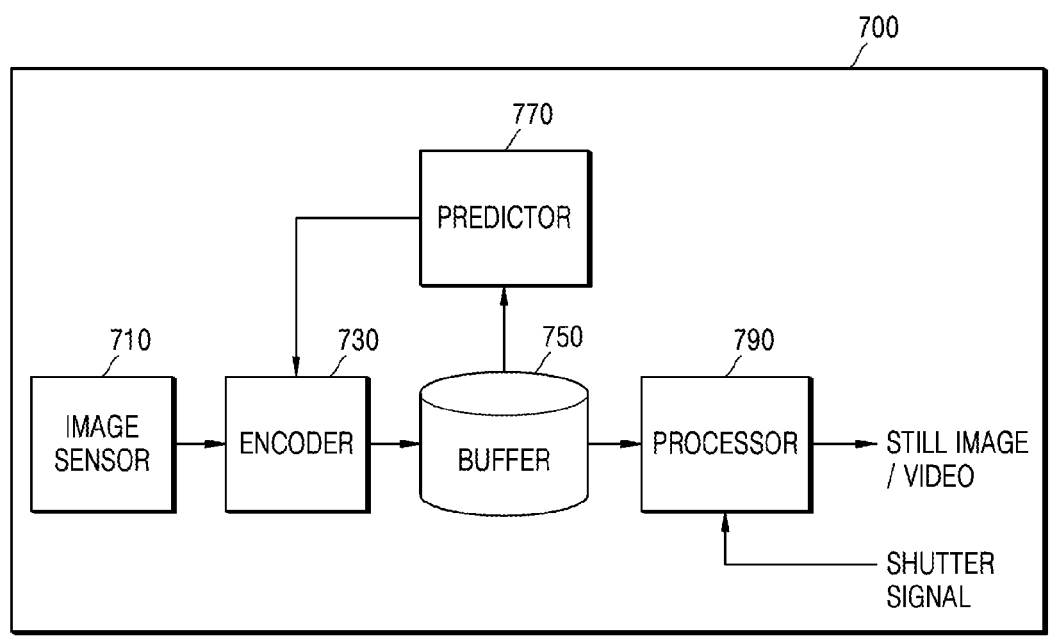
FIG. 7 is a block diagram illustrating an example photographing device that captures images by controlling an encoding type, according to an example embodiment.

FIG. 7 is a block diagram illustrating an example photographing device 700 that captures images by controlling an encoding type, according to an example embodiment. The photographing device 700 may include an image sensor 710, an encoder (e.g., including encoding circuitry) 730, a buffer 750, a predictor (e.g., including circuitry configured to predict and provide a time point) 770, and a processor 790.

The image sensor 710 may refer, for example, to a photoelectric converter that is integrated by using technologies for manufacturing semiconductor devices and capable of converting optical signals into electric signals. The photographing device 700 may acquire images with uniform resolution via the image sensor 710.

The encoder 730 may control an encoding type to change resolution of an input image acquired from the image sensor 710, and store the image with the changed resolution in the buffer 750. The encoder 730 may generate high resolution input images by using a high resolution encoding type at a predetermined time point, and generate low resolution input images by using a low resolution encoding type at other time points.

The buffer 750 may be a temporary storage device for storing the input image generated by the image sensor 710. The buffer 750 may store high resolution input images generated by the image sensor 710 at a predetermined time point and low resolution input images generated by the image sensor 710 at time points other than the predetermined time point.

When input images greater than a certain amount are stored in the buffer 750, the predictor 770 may predict a predetermined time point that is significant to the user by using the stored input images. The predictor 770 may predict the predetermined time point by using photography history data stored in a database. Also, the predictor 770 may predict the predetermined time point that is significant to the user by using an algorithm. According to some embodiments, the predictor 770 may periodically determine the predetermined time point based on predetermined time intervals or predetermined frame intervals.

The predictor 770 may transmit the predicted time point to the encoder 730 and thus provide information so that the encoder 730 may change the encoding type at the predetermined time point.

The processor 790 may change the resolution by controlling the encoding type. According to some example embodiments, an encoding controller (not shown) may determine the encoding type. When the processor 790 receives a photography command, the processor 790 may search for, from the buffer 750, a high resolution input image that is stored within a threshold photography command reception time point. When a high resolution input image is found, the processor 790 may determine a result image based on the found second resolution input image. When the high resolution input image is not found, the processor 790 may generate at least one of low resolution input images as a result image.

The result image being determined based on the found second resolution input image may indicate that the found second resolution input image is generated as the result image, the result image is generated by improving quality of the first resolution input images of the photography command reception time point based on the found second resolution input image, or the result image is generated by applying a difference between the found second resolution input image and the first resolution input images of the photography command reception time point to the found second resolution input image.

The generating of the at least one of the first resolution input images as the result image may indicate generating, from among the first resolution input images, an input image captured at a time point closest to the photography command reception time point, as the result image.

The result image may be a still image or a video.

Although the image sensor 710, the encoder 730, the buffer 750, the predictor 770, and the processor 790 are described as separate components according to the present example embodiment, according to some example embodiments, the image sensor 710, the encoder 730, the buffer 750, the predictor 770, and the processor 790 may be combined and formed as a single component.

Also, although the image sensor 710, the encoder 730, the buffer 750, the predictor 770, and the processor 790 are described as being adjacent in the photographing device 700 according to the present example embodiment, the image sensor 710, the encoder 730, the buffer 750, the predictor 770, and the processor 790 do not have to be physically adjacent to one another, and the image sensor 710, the encoder 730, the buffer 750, the predictor 770, and the processor 790 may be spaced apart according to some example embodiments.

Also, the photographing device 700 is not limited to a physical device. Some functions of the photographing device 700 may be implemented as software instead of hardware.

Figure 8:
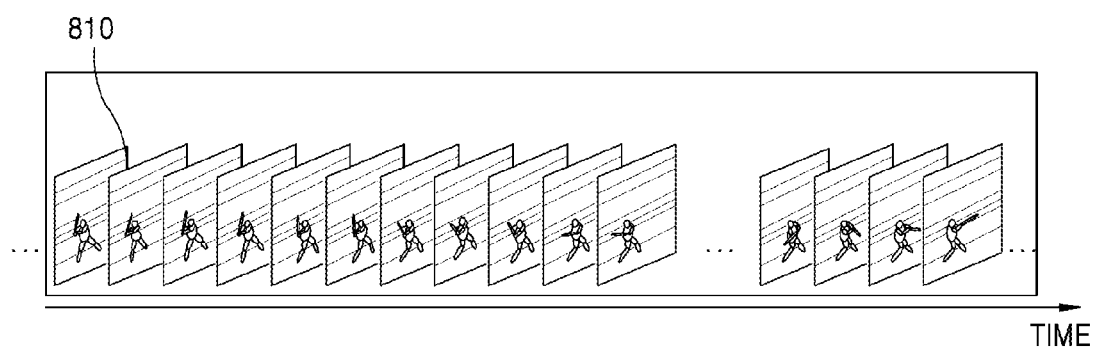
FIG. 8 is a diagram illustrating example input images acquired from an image sensor when the images are captured by controlling an encoding type, according to an example embodiment.

FIG. 8 is a diagram illustrating example input images acquired from an image sensor when the images are captured by controlling an encoding type, according to an example embodiment. When images are captured by controlling the encoding type, input images 810 with identical resolution may be acquired from the image sensor 710.

When the encoding type is controlled, input images with identical resolution may be obtained from the image sensor 710. This is different from the case shown in FIG. 6, in which the image sensor is controlled and high resolution input images and low resolution input images are acquired together by the image sensor 510.

When the images are captured by controlling the encoding type, the buffer 750 may also store high resolution images and low resolution images as in the case of FIG. 6.

Figure 9:
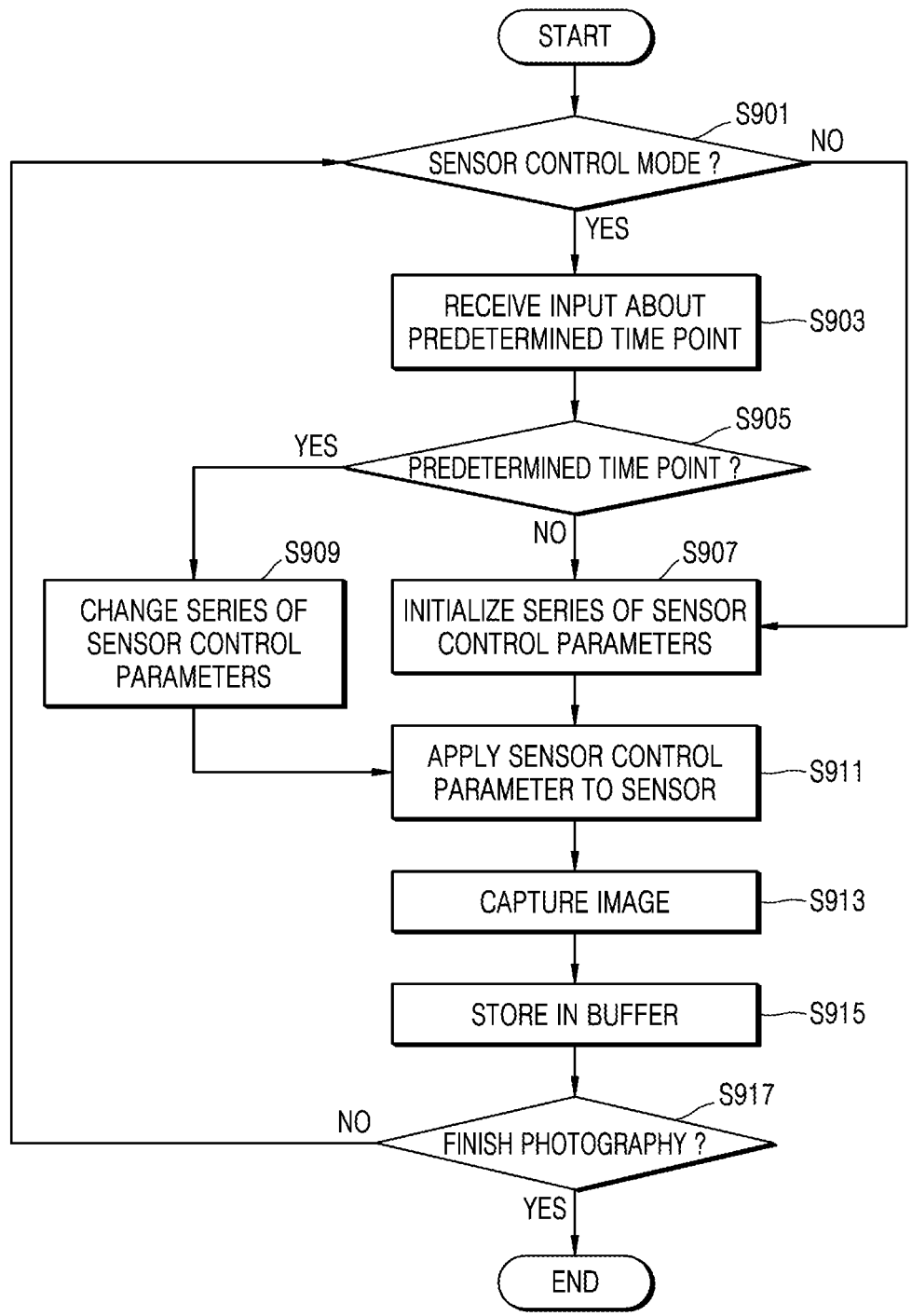
FIG. 9 is a flowchart illustrating an example method of controlling a photographing device that buffers images by controlling an image sensor, according to an example embodiment.

FIG. 9 is a flowchart illustrating an example method of controlling a photographing device that buffers images by controlling an image sensor, according to an example embodiment.

The present flowchart may illustrate sequential processes from a time point at which a camera is turned on or a camera application is executed by the user, a shutter input, i.e., a photography command, is received, and until the camera is turned off or the camera application is turned off.

When the photographing device 300 captures images by controlling the image sensor, the photographing device 300 may select, in advance, a sensor control mode from among the sensor control mode and an encoding control mode.

When the photographing device 300 is set to the sensor control mode (S901), the photographing device 300 may receive an input about a predetermined time point (S903). The input about the predetermined time point may be automatically received by a preset setting or manually received by the user. According to an example embodiment in which the predetermined time point is automatically received by the preset setting, the photographing device 300 may set a significant scene in advance, predict a time point at which the significant scene appears by using various methods, and detect the predicted time point as the input about the predetermined time point.

The photographing device 300 may determine whether a current time point corresponds to the predetermined time point received in operation S903 (S905). When the current time point does not correspond to the predetermined time point received in operation S903, the photographing device 300 may initialize a series of sensor control parameters (S907), and apply the initialized series of sensor control parameters to a sensor (S911). The series of sensor control parameters may indicate respective sensor control parameters of a series of sequential time points. The initializing of the series of sensor control parameters may be understood as initializing parameters, for example, setting parameters to capture (S913) live view images with identical resolution or setting parameters to capture high resolution live view images with certain intervals. The initialized parameters may be uniformly maintained unless a parameter change input is received. The live view images may be captured by an image sensor according to preset settings of the sensor control parameters.

When the current time point corresponds to the predetermined time point received in operation S903, the photographing device 300 may change the series of sensor control parameters (S909). In this case, the sensor control parameters may be changed such that high resolution images are captured from the live view images. The photographing device 300 may apply the changed sensor control parameters to a sensor (S911). The changed sensor control parameters may be initialized again after an image is captured. According to an embodiment, parameters may be initialized to capture high resolution live view images in predetermined intervals, and an input about a predetermined time point may be received by a prediction algorithm of a predetermined scene. In this case, high resolution live view images may be captured at the predetermined time point, but low resolution live view images may be periodically captured at time points nearby the predetermined time point, instead high resolution live view images.

When the photographing device 300 is not set to the sensor control mode (S901), the photographing device 300 may initialize the series of sensor control parameters (S907), and apply the initialized series of sensor control parameters to the sensor (S911). The photographing device 300 may capture live view images (S913) and store the captured live view images in the buffer 330 (S915). When the photography is not finished (S917), the photographing device 300 may repeat operation S901. By repeating operations, the photographing device 300 may store high resolution images and low resolution images of an object in the buffer 330. The high resolution images stored in the buffer 330 may be used to generate a result image.

FIG. 10 is a flowchart illustrating an example method of controlling a photographing device that buffers images by controlling an encoding type, according to an example embodiment. The flowchart is an example of a method of encoding an image captured from a live view image. The flowchart may illustrate sequential processes from a time point at which a camera is turned on or a camera application is executed by the user, a shutter input, i.e., a photography command, is received, and until the camera is turned off or the camera application is turned off.

When the photographing device 300 captures images by controlling an encoding type, the photographing device 300 may select, in advance, the encoding control mode from among the sensor control mode and the encoding control mode.

When the photographing device 300 is set to the encoding control mode (S1001), the photographing device 300 may receive an input about a predetermined time point (S1003).

The input about the predetermined time point may be automatically received by a preset setting or manually received by the user.

The photographing device 300 may determine whether a current time point corresponds to the predetermined time point received in operation S1003 (S1007). When the current time point corresponds to the predetermined time point received in operation S1003, the photographing device 300 may high resolution encode an input image acquired from an image sensor (S1009), and store the encoded input image in the buffer 330 (S1019).

When the current time point does not correspond to the predetermined time point received in the operation S1003, the photographing device 300 may determine whether a high resolution image is present within previous N frames stored in the buffer 330 (S1011).

When the high resolution image is not present within the previous N frames, the photographing device 300 may low resolution encode the input image acquired from the image sensor (S1021), and store the encoded input image in the buffer 330 (S1019).

When the high resolution image is present within the previous N frames, the photographing device 300 may extract a difference image between the high resolution image and a current image (S1013). In the present description, the difference image may indicate an image that shows a difference between a current image and a high resolution image that is previously stored in the buffer 330.

When a size of the difference image is smaller than a threshold value (S1015), the photographing device 300 may high resolution encode the difference image (S1017) and store the encoded difference image in the buffer 330 (S1019). However, when the size of the difference image is equal to or greater than the threshold value (S1015), the photographing device 300 may low resolution encode an input image acquired from the image sensor (S1021), and store the encoded input image in the buffer 330 (S1019). When the difference image is excessively large, high resolution encoding the difference image may cause approximately all input images to be high resolution encoded.

When the photography is not finished (S1023), the photographing device 300 may repeat operation S1001. By repeating operations, the photographing device 300 may store high resolution images and low resolution images of an object in the buffer 330. The high resolution images stored in the buffer 330 may be used to generate a result image.

According to the aforementioned example embodiments, the photographing device and the method of controlling the photographing device may reduce additional consumption of memory capacity and power and continuously capture high resolution images.

Example embodiments may be embodied as computer-readable codes on a non-transitory computer-readable recording medium. The computer-readable recording medium is any data storage device that can store programs or data which can be thereafter read by a computer system.

When read from the computer-readable recording medium and executed by a processor, the computer-readable codes are configured to perform operations of a method of controlling a photographing device according to the present example embodiments. The computer-readable codes may be implemented as various programming languages. Also, functional programs, codes, and code segments for implementing the present embodiments may be easily programmed by one of ordinary skill in the art to which the present embodiments pertain.

Examples of the computer-readable medium include ROMs, RAMs, CD-ROMs, magnetic tapes, floppy discs, optical media. Also, the computer-readable medium may be distributed over computer systems connected via a network so that the computer-readable codes are stored or executed in a distributed fashion.

It should be understood that the example embodiments described herein should be considered in a descriptive sense only and not for purposes of limitation. Descriptions of features or aspects within each example embodiment should typically be considered as available for other similar features or aspects in other embodiments. For example, a single element may be separately implemented, and separate elements may be implemented in a combined form.

While one or more example embodiments have been described with reference to the figures, it will be understood by those of ordinary skill in the art that various changes in form and details may be made therein without departing from the spirit and scope as defined by the following claims.

What is claimed is:

1. A method of controlling a photographing device, the method comprising:
   storing first resolution input images acquired from live view images in a buffer;
   storing, at a time point based on an input, a second resolution input image acquired at the time point from the live view images in the buffer; and
   generating a result image based on the second resolution input image when the second resolution input image, which is stored within a threshold time from a photography command reception time point, is found in the buffer, and generating at least one of the stored first resolution image images as the result image when the second resolution input image, which is stored within the threshold time from the photography command reception time point, is not found in the buffer.

2. The method of claim 1, wherein a first resolution and a second resolution are determined based on settings of an image sensor or determined based a type of encoding of an input image acquired from the image sensor.

3. The method of claim 1, wherein a second resolution is higher than a first resolution.

4. The method of claim 1, wherein the input of the time point is automatically received based on a preset setting or manually received.

5. The method of claim 4, wherein the preset setting is determined based on photography history data stored in a database.

6. The method of claim 4, wherein the preset setting is periodically determined based on time intervals or frame intervals.

7. The method of claim 1, wherein when the second resolution input image, which is stored within the threshold time from the photography command reception time point, is found in the buffer, the result image is generated using the found second resolution input image.

8. The method of claim 1, wherein when the second resolution input image, which is stored within the threshold time from the photography command reception time point, is found in the buffer, the result image is generated by improving quality of the first resolution input images of the photography command reception time point based on the found second resolution input image.

9. The method of claim 1, wherein when the second resolution input image, which is stored within the threshold time from the photography command reception time point, is found in the buffer, the result image is generated by applying a difference between the found second resolution input image and the first resolution input image of the photography command reception time point to the found second resolution input image.

10. A photographing device comprising:
an input comprising input circuitry configured to receive an input of a time point;
a buffer; and
a processor configured to store first resolution input images acquired from live view images in the buffer, to store a second resolution input image acquired from the live view images at the time point in the buffer, to generate a result image based on the second resolution input image when the second resolution input image, which is stored within a threshold time from a photography command reception time point, is found in the buffer, and to generate at least one of the stored first resolution image images as the result image when the second resolution input image, which is stored within the threshold time from the photography command reception time point, is not found in the buffer.

11. The photographing device of claim 10, wherein a first resolution and a second resolution are determined based on settings of an image sensor or determined based on a type of encoding an input image acquired from the image sensor.

12. The photographing device of claim 10, wherein a second resolution is higher than a first resolution.

13. The photographing device of claim 10, wherein the input of the time point is automatically received based on a preset setting or manually received.

14. The photographing device of claim 13, wherein the preset setting is determined based on photography history data stored in a database.

15. The photographing device of claim 13, wherein the preset setting is periodically determined based on time intervals or frame intervals.

16. The photographing device of claim 10, wherein when the second resolution input image, which is stored within the threshold time from the photography command reception time point, is found in the buffer, the result image is generated using the found second resolution input image.

17. The photographing device of claim 10, wherein when the second resolution input image, which is stored within the threshold time from the photography command reception time point, is found in the buffer, the result image is generated by improving quality of the first resolution input images of the photography command reception time point based on the found second resolution input image.

18. The photographing device of claim 10, wherein when the second resolution input image, which is stored within the threshold time from the photography command reception time point, is found in the buffer, the result image is generated by applying a difference between the found second resolution input image and the first resolution input image of the photography command reception time point to the found second resolution input image.

19. A non-transitory computer-readable recording medium having recorded thereon a program, which, when executed by a computer, performs the method of claim 1.

* * * * *